(12) United States Patent
Kobayashi et al.

(10) Patent No.: US 6,220,403 B1
(45) Date of Patent: Apr. 24, 2001

(54) EDDY CURRENT BRAKING SYSTEM

(75) Inventors: Shin Kobayashi; Yukitoshi Narumi, both of Fujisawa (JP)

(73) Assignee: Isuzu Motors Limited (JP)

( * ) Notice: Subject to any disclaimer, the term of this patent is extended or adjusted under 35 U.S.C. 154(b) by 0 days.

(21) Appl. No.: 09/283,890

(22) Filed: Apr. 1, 1999

(30) Foreign Application Priority Data

Apr. 2, 1998 (JP) .................................................. 10-106963

(51) Int. Cl.[7] .................................................. B60L 7/00
(52) U.S. Cl. .................................................. 188/158; 188/164
(58) Field of Search .................................................. 188/158, 164, 188/159

(56) References Cited

U.S. PATENT DOCUMENTS

| | | | |
|---|---|---|---|
| 3,601,641 | * 8/1971 | Baermann | 310/93 |
| 3,656,815 | * 4/1972 | Talebi et al. | 303/21 |
| 3,962,595 | * 6/1976 | Eddens | 310/93 |
| 4,122,922 | * 10/1978 | Baermann | 188/267 |
| 4,482,034 | * 11/1984 | Baermann | 188/165 |
| 5,023,499 | * 6/1991 | Kuwahara | 310/105 |
| 5,045,739 | * 9/1991 | Kuwahara | 310/105 |
| 5,050,711 | * 9/1991 | Sawato | 188/164 |
| 5,054,587 | * 10/1991 | Matsui et al. | 188/267 |
| 5,154,623 | * 10/1992 | Kuwahara | 188/164 |
| 5,206,555 | * 4/1993 | Morris et al. | 310/105 |
| 5,303,802 | * 4/1994 | Kuwahara | 188/158 |
| 5,465,815 | * 11/1995 | Ikegami | 188/164 |

* cited by examiner

*Primary Examiner*—Robert J. Oberleitner
*Assistant Examiner*—Benjamin A. Pezzlo
(74) *Attorney, Agent, or Firm*—John E. Toupal; Harold G. Jarcho

(57) ABSTRACT

A guide tube formed of a non-magnetically permeable material is coaxially disposed in a brake drum coupled to a rotational shaft and a magnet support tube formed of a non-magnetically permeable material is axially movably supported within the guide tube. A plurality of magnets are supported at equal annular intervals on the outer wall of the magnet support tube and proximal surfaces of ferromagnetic members are coupled to magnetic pole surfaces at opposite ends of the magnet. Actuators reciprocate the magnet support tube between a braking position in which extreme end surfaces of the ferromagnetic members are opposed to an inner surface of the brake drum and a non-braking position in which the ferromagnetic members are withdrawn from the brake drum.

17 Claims, 3 Drawing Sheets

EDDY CURRENT BRAKING SYSTEM

BACKGROUND OF THE INVENTION

The invention relates to an eddy current reduction braking system, which increases both heat dissipation and braking torque.

In a magnet type eddy current reduction apparatus disclosed in Japanese Patent Publication No. 3-86,050 Publication or the like, a magnet supporting tube is reciprocated in an axial direction to switch between braking and non-braking conditions. Such apparatus has the inherent disadvantage of increasing space requirements in the axial direction.

In a magnet type eddy current reduction apparatus disclosed in Japanese Patent Publication No. 7-118,901, a movable magnet supporting tube is rotated to adjust the relative polarities of magnets axially adjacent in a pair of axially aligned magnet arrays to switch between braking and non-braking conditions. In such an apparatus, however, each pair of N and S-poles of each magnet are directed in a radial direction of the brake drum. It is therefore necessary to process outer and inner surfaces of the magnets into cylindrical or circular form so that an effective magnetic flux is applied to the brake drum via a ferromagnetic plate. The required magnet processing considerably increases cost. Furthermore, the ferromagnetic plates must be large so as to completely cover the magnets in the braking condition. Complete covering by the plates allows the magnets to apply a magnetic field to the brake drum without any substantial leakage. Magnetic flux density cannot be effectively increased to improve braking force therefor due to ferromagnetic plate limitations.

The object of the present invention, therefore, is to provide an eddy current reduction apparatus which is compact in its entirety, and in which braking performance is enhanced.

SUMMARY OF THE INVENTION

The present invention is an eddy current braking system including a guide tube formed of a non-magnetically permeable material coaxially disposed in a brake drum coupled to a rotational shaft, a support tube formed of a non-magnetically permeable material mounted for axial movement on the guide tube, and an array of permanent magnets supported at equal annular intervals on an outer peripheral wall of the magnet support tube. Also included are a pair of ferromagnetic pole piece members with proximal end surfaces adjacent to opposed magnetic pole surfaces at opposite ends of each magnet and extreme end surfaces supported in openings of a wall portion of the guide tube and closely adjacent to an inner peripheral surface of the brake drum. An actuator mechanism provides reciprocating movement of the magnet support tube between a braking position in which the magnetic pole surfaces at opposite ends of each permanent magnet are adjacent to the proximal surfaces of a pair of the ferromagnetic members and a non-braking position in which the magnetic pole surfaces of the permanent magnet are withdrawn from the proximal surfaces of the ferromagnetic members. The stationary ferromagnetic members can be mounted closely adjacent to the brake drum to establish a short magnetic circuit path.

According to another embodiment of the invention, a guide tube having a rectangular cross-section and formed of a non-magnetically permeable material is coaxially disposed in a brake drum coupled to a rotational shaft, a magnet support tube formed of a non-magnetically permeable material is mounted for axial movement on the guide tube, an array of permanent magnets are supported at equal annular intervals on an outer peripheral wall of the magnet support tube, and proximal surfaces of a pair of ferromagnetic pole piece members are coupled to opposite magnetic pole surfaces at opposite ends of each permanent magnet. Also included is an actuator mechanism for reciprocating the magnet support tube between a braking position in which the extreme end surfaces of the ferromagnetic members are juxtaposed to the inner surface of the brake drum and a non-braking position in which the ferromagnetic members are axially spaced from the inner surface of the brake drum. The ferromagnetic members shorten magnetic circuit paths to increase braking torque and coupling of their ends to the ends of the magnets simplifies construction of the braking system.

According to certain features of the magnetic north and south poles at opposite ends of each magnet are oriented annularly and each ferromagnetic member is curved with a proximal end coupled to one of the magnetic pole surfaces of a magnet and an extreme end extending in annularly and radially outwardly directions toward the inner surface of the brake drum. The features optimize magnetic circuit paths to enhance braking performance.

According to other features of the above embodiment, the guide tube has an outer wall having a magnetically permeable wall portion and an axially aligned non-magnetically permeable and extremely thin portion covering the extreme end surface of the ferromagnetic members when in a non-braking position. These features further enhance braking performance.

BRIEF DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
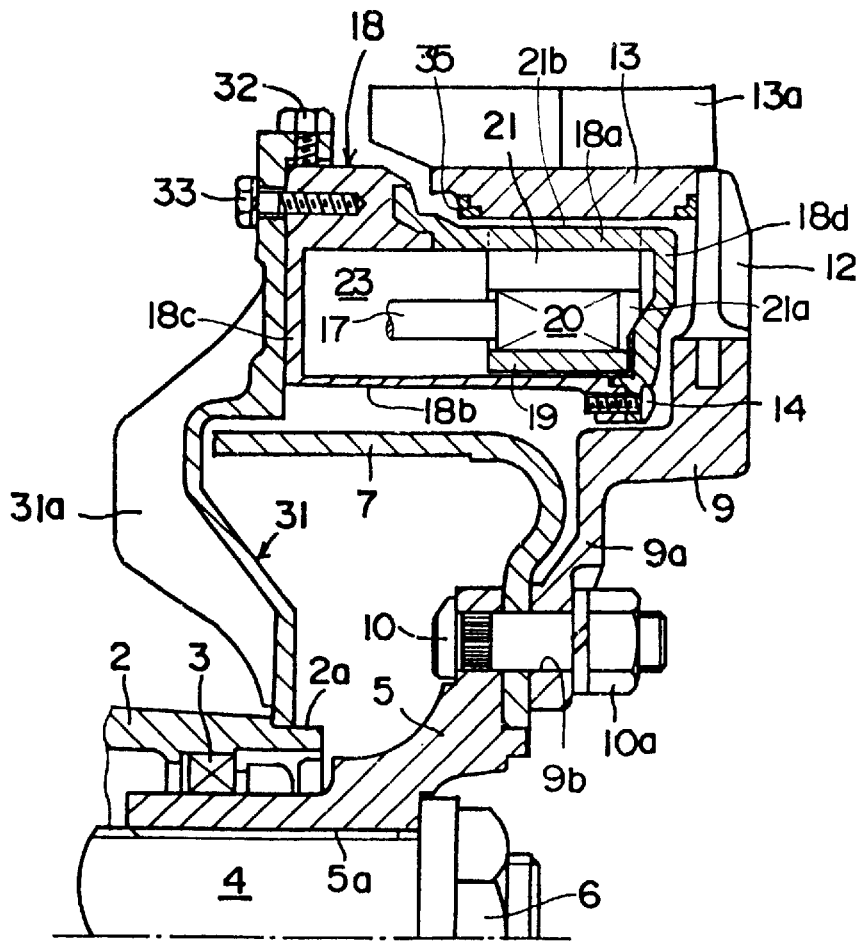
FIG. 1 is a front sectional view of an eddy current braking system according to a first embodiment of the invention.

In an eddy current reduction braking system shown in FIG. 1, a brake drum 13 is coupled to a rotational shaft 4. The coupling mechanism includes a mounting flange 5 with a spline hole 5a fitted in the output rotational shaft 4 which is supported by a bearing 3 on an end wall of a gear box 2 of a speed change gear. The shaft 4 projects from the end wall, and is secured by a nut 6. An end wall of a brake drum 7 of a parking brake and a flange portion 9a integral with a wheel 9 for supporting the brake drum 13 are superposed to the mounting flange 5 and secured by a plurality of bolts 10 and nuts 10a.

The brake drum 13 is formed of a material having high magnetic permeability such as iron, and a number of cooling fins 13a are provided at equal intervals on an outer peripheral wall thereof. A proximal end of the brake drum 13 is coupled to a number of supporting arms (spokes) 12 extending in a radial direction from the wheel 9. Interiorly of the brake drum 13 is a coaxially disposed guide tube 18 having a hollow portion 23 (FIG. 2) with a rectangular cross-section. The stationary guide tube 18 is formed of a non-magnetically permeable material such as aluminum and is secured by bolts (not shown) to a frame plate 31 attached to a projecting wall 2a of the gear box 2. Coupled to both ends of an outer tube portion 18a and an inner tube portion 18b of the guide tube 18 are, respectively, annular end wall plates 18c and 18d. In the illustrated embodiment, the end wall plate 18c and the inner tube portion 18b are integrally constituted as a tube body having an inverted L-shape in section, and the outer tube portion 18a and the end wall plate 18d are a unit coupled to the tube body by bolts 14.

A movable magnet support tube 19 is coaxially mounted in the hollow portion 23 of the guide tube 18. The support tube 19 is mounted for axial movement on the inner tube portion 18b. An array of magnets 20 are supported at annularly equal intervals on the outer peripheral wall of the support tube 19. Each block-like magnet 20 is fitted and supported in a receptacle 19a (FIG. 2) having a rectangular shape in section and formed integrally with the magnet support tube 19. The magnets 20 on the magnet support tube 19 are preferably disposed with north and south poles oriented in annular alignment and with directly adjacent poles of opposite polarity, as shown in FIG. 3. Proximal surfaces 21a of a pair of curved ferromagnetic pole piece members 21 are juxtaposed to the magnetic pole surfaces at opposite ends of each magnet 20.

Each ferromagnetic member 21 is curved in annular and radially outward directions with an end extending through a slot in the outer tube portion 18a. Thus, extreme end surfaces 21b of the members are closely adjacent to the inner peripheral surface 13c of the brake drum 13. Actually, when casting the L-shaped in section outer tube portion 18a and the end wall plate 18d from a non-magnetically permeable material such as aluminum, the extreme end portions of the ferromagnetic members 21 are cast within openings in the outer tube portion 18a. Each magnet 20 and a pair of adjacent ferromagnetic members 21 have a U-shape as shown in FIG. 3. The magnets 20 are supported on the axially movable support tube 19 and the ferromagnetic members 21 are supported on the stationary outer tube portion 18a as described above. In the illustrated embodiment, the axially directed widths of the ferromagnetic members 21 are the same as or somewhat greater than those of the magnets 20.

Figure 2:
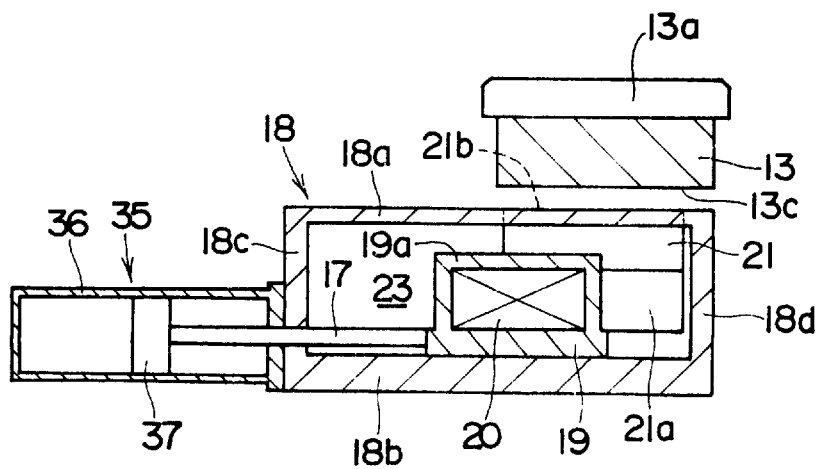
FIG. 2 is a front sectional view showing main components of the eddy current braking system shown in FIG. 1.
Figure 3:
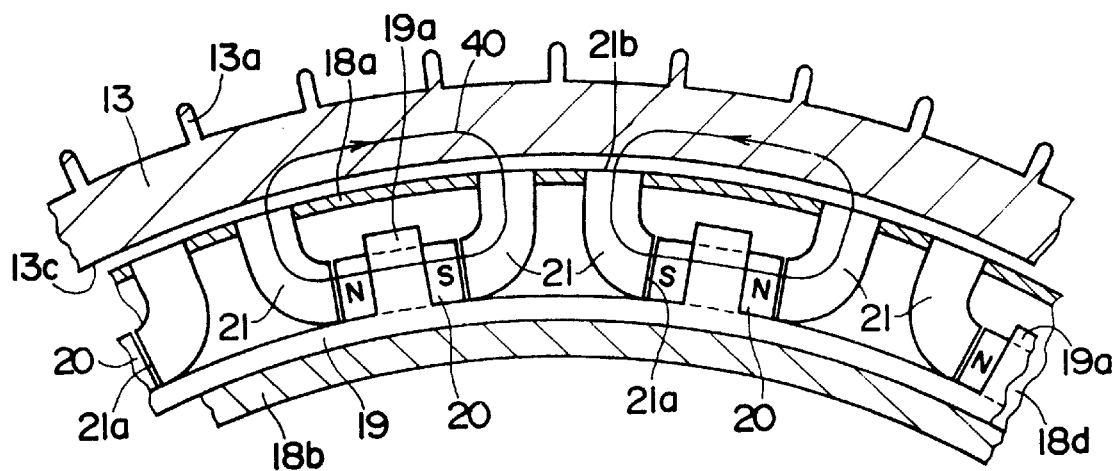
FIG. 3 is a side sectional view showing a braking condition of the eddy current braking system.

As shown in FIG. 2, a plurality of actuator mechanisms 35 are supported at equal intervals on the end wall plate 18c joined with a frame plate 31 having a reinforcing rib 31a. In each actuator 35, a piston 37 is fitted in a cylinder 36 to define a pair of fluid pressure chambers, and a rod 17 projects from the piston 37 into the hollow portion 23 via a slit of the end wall plate 18c. Each rod 17 is connected to the magnet support tube 19.

In a braking condition shown in FIGS. 1 and 3, the magnet support tube 19 projects into the brake drum 13, and each magnet 20 is disposed between the proximal surfaces of a pair of ferromagnetic members 21 supported on the outer tube portion 18a. When the rotating brake drum 13 crosses the magnetic flux which is applied to inner surface 13c of the brake drum 13 by the magnets 20 via the ferromagnetic members 21, eddy currents are generated and a braking torque is produced. At that time, magnetic circuits 40 are formed in each magnet 20, a pair of adjacent ferromagnetic members 21 and the brake drum 13, as illustrated in FIG. 3. Because the ferromagnetic members 21 extend through the outer tube portion 18a directly juxtaposed positions to the inner surface 13c of the brake drum 13, magnetic flux leakage is low, and a large braking force is obtained. Also, since adjacent magnets 20 have opposite annular N and S pole orientations, directly adjacent poles have the same polarity. Accordingly, flux leakage between adjacent magnets does not occur to diminish braking performance.

In a non-braking condition, the magnet support tube 19 is drawn out of the brake drum 13 along the guide tube 18 by the actuators 35. (FIG. 2 shows a state in which the magnet support tube 19 are partially withdrawn.) The magnets 20 therefore apply no magnetic flux to the brake drum 13, and a braking force is not produced.

Figure 4:
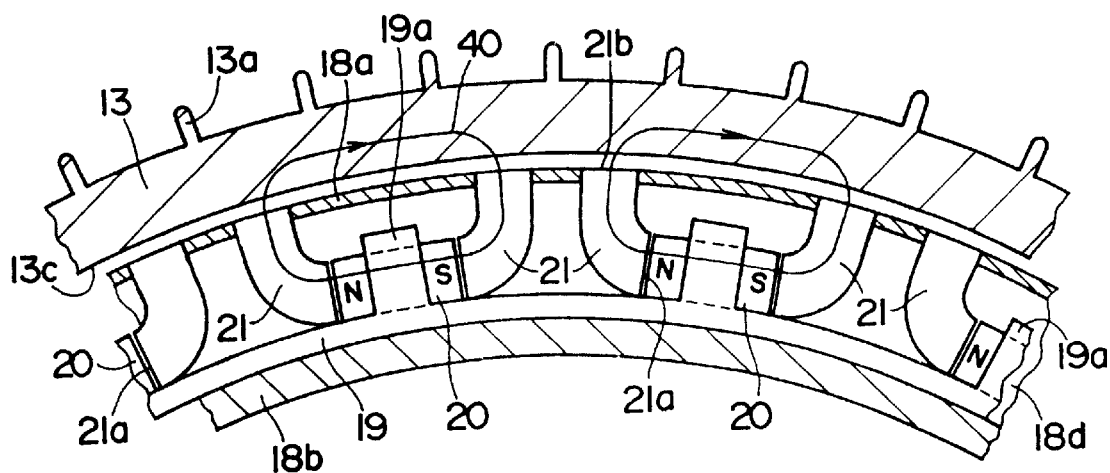
FIG. 4 is a side sectional view showing a braking condition of an eddy current braking system according to a modified embodiment of the present invention.

The embodiment shown in FIG. 4 is different from that shown in FIG. 3 only in that the polarities of ends of magnets 20 annularly adjacent to each other are opposite. In this embodiment, the annular spacing between the magnets 20 can be made larger to suppress magnetic flux leakage between the opposite polarity poles of adjacent magnets 20 so as not to seriously diminish braking performance.

Figure 5:
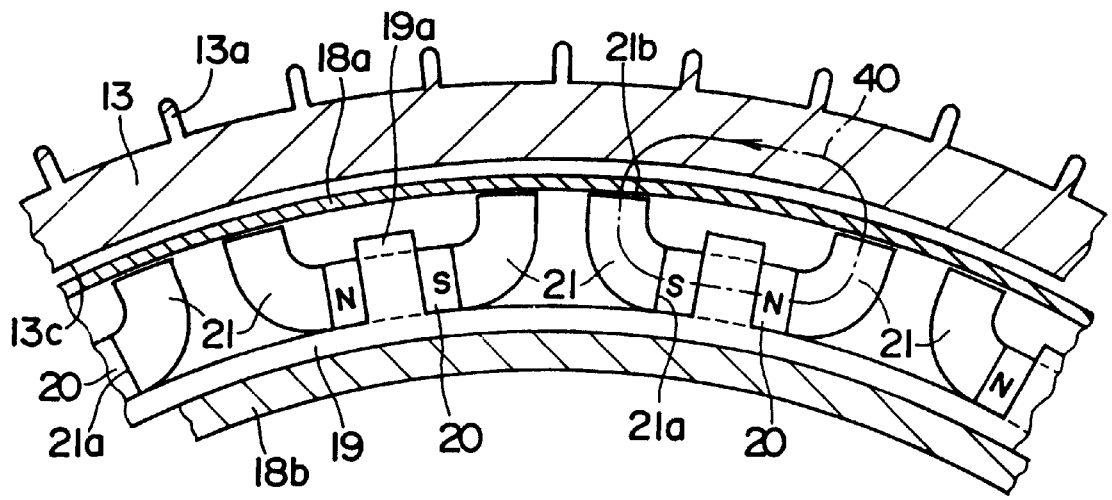
FIG. 5 is a side sectional view showing a braking condition of an eddy current braking system according to another embodiment of the present invention.
Figure 6:
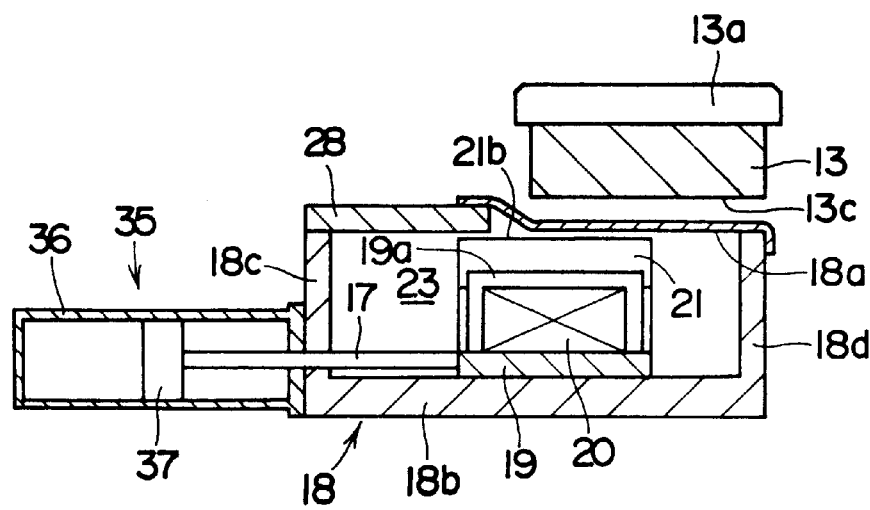
FIG. 6 is a front sectional view showing main components of the eddy current braking system embodiment shown in FIG. 5.

In the embodiments shown in FIGS. 5 and 6, the guide tube 18 defines a hollow portion 23 in the form of a rectangle in section. The guide tube includes end wall plates 18c, 18d formed of a non-magnetically permeable material, an inner tube portion 18b formed of a non-magnetically permeable material and an outer wall portion having a left half yoke tube portion 28 formed of a magnetically permeable material, and a right half tube portion 18a formed from a non-magnetically permeable material such as a thin stainless steel sheet. A magnet support tube 19 formed of a non-magnetically permeable material is supported for axial movement in the hollow portion 23 of the guide tube 18. Retaining the magnets 20 are receptacles 19a integrally formed at equal intervals on the outer peripheral wall of the magnet support tube 19. Each magnet 20 is fitted and supported in an opening in the shape of a rectangle in section formed by each receptacle 19a. Proximal surfaces 21a of a pair of curved ferromagnetic pole piece members 21 are fixed to the magnetic pole surfaces at opposite ends of each magnet 20. The ferromagnetic members 21 extend annularly and radially outwardly from the magnetic pole surfaces at ends of the magnets 20 with extreme end surfaces 21b of the ferromagnetic members 21 juxtaposed to the inner surface 13c of the brake drum 13 through the outer tube portion 18a. Each magnet 20 and attached pair of ferromagnetic members 21 are combined substantially in a U-shaped form. Other components are similar to those of the embodiments shown in FIGS. 1 to 3.

In a braking condition, the magnet support tube 19 is moved rightwardly from the position shown in FIG. 6 to a position within the brake drum 13. The extreme end surfaces 21b of the ferromagnetic members 21 then are juxtaposed to the inner surface 13c of the brake drum 13 via the ferromagnetic members 21 and magnetic circuits 40 are formed through the magnets 20, the pair of ferromagnetic members 21, the tube portion 18a and the brake drum 13. Accordingly, eddy currents are generated in the brake drum 13, and a braking force is produced.

In a non-braking condition, the magnet support tube 19 is moved leftwardly from the position shown in FIG. 6 into a position in which extreme end surfaces 21b of the ferromagnetic members 21 are juxtaposed to the inner surface of the yoke tube 28. Consequently, magnetic short circuits are formed through a magnet 20, a pair of ferromagnetic members 21 and the yoke tube 28. Magnetic flux therefore is not applied to the brake drum 13, eddy currents are not generated and a braking force is not produced. The outer tube portion 18a prevents dust and muddy water from entering the hollow portion 23 and the wall-thickness thereof is made thin to allow disposition of the extreme ends 21b of the ferromagnetic members 21 closely adjacent to the inner surface 13c of the brake drum 13. Consequently, in the braking condition, a high density of magnetic flux is applied by the magnets 20 to the brake drum 13 via the ferromagnetic members 21 and the outer tube portion 18a and since the ferromagnetic members 21 are not cast into the outer tube portion 18a of the guide tube 18, manufacturing costs are reduced.

Obviously, many modifications and variations of the present invention are possible in light of the above teachings. It is to be understood, therefore, that the invention can be practiced otherwise than as specifically described.

What is claimed is:

1. A vehicle braking system comprising:
    a magnetically permeable rotatable brake drum defining an annular inner drum surface;
    a drive shaft rotatably coupled to said brake drum;
    annular support means mounted within said brake drum;
    a plurality of permanent magnets mounted on said support means and spaced apart in an annular array juxtaposed to said inner drum surface, each of said magnets having a pair of opposing north and south poles aligned with said array;
    actuator means for producing axial movement of said support means between braking and non-braking positions; and
    a pole piece having a proximal end juxtaposed to each of said poles and an extreme end juxtaposed to said inner surface of said brake drum and wherein each of said pole pieces is curved and projects from said pole annularly and toward said inner drum surface.

2. A system according to claim 1 wherein each said permanent magnet and attached pole pieces have a U-shape with ends facing said inner drum surface.

3. A system according to claim 2 wherein each said pair of opposing north and south poles have the same annular orientation.

4. A system according to claim 2 wherein annularly adjacent pairs of opposing north and south poles have opposite annular orientations.

5. A system according to claim 1 wherein said support means comprises a magnet support tube having an outer surface supporting said annular array and being axially movable by said actuator means between a braking position within said brake drum and a non-braking position withdrawn from said brake drum.

6. A system according to claim 5 wherein said support means further comprises an annular guide tube defining a hollow annular chamber retaining said support tube.

7. A system according to claim 6 wherein said pole pieces are fixed to and axially movable with said magnets.

8. A system according to claim 7 wherein an outer annular wall portion of said guide tube includes an annular first position formed from a non-magnetically permeable material and juxtaposed to said array in said braking position; and an annular second wall portion axially aligned with said first portion, formed of a magnetically permeable material and juxtaposed to said array in said non-braking position.

9. A system according to claim 1 wherein each said permanent magnet and attached pole pieces have a U-shape with ends facing said inner drum surface.

10. A vehicle braking system comprising:
    a magnetically permeable rotatable brake drum defining an annular inner drum surface;
    a drive shaft rotatably coupled to said brake drum;
    annular support means mounted within said brake drum; said support means comprising a magnet support tube having an outer surface and being axially movable between a braking position within said brake drum and a non-braking position withdrawn from said brake drum, and an annular guide tube defining a hollow annular chamber retaining said support tube;
    a plurality of permanent magnets mounted on said support tube and spaced apart in an annular array juxtaposed to said inner drum surface, each of said magnets having a pair of opposing north and south poles aligned with said array;
    actuator means for producing axial movement of said support tube between said braking and non-braking positions; and
    a pole piece having a proximal end juxtaposed to each of said poles and an extreme end juxtaposed to said inner surface of said brake drum, said pole pieces being fixed to and axially movable with said magnets and each of said pole pieces being curved and projecting from said pole annularly and toward said inner drum surface; and wherein an outer annular wall portion of said guide tube includes an annular first position formed from a non-magnetically permeable material and juxtaposed to said array in said braking position; and an annular second wall portion axially aligned with said first portion, formed of a magnetically permeable material and juxtaposed to said array in said non-braking position.

11. A system according to claim 10 wherein said extreme ends of said pole pieces are retained in openings in an outer annular wall portion of said guide tube.

12. A system according to claim 11 wherein said outer annular wall portion of said guide tube and said pole pieces are an integrally cast unit.

13. A system according to claim 11 wherein said support tube comprises annularly spaced apart receptacles, each retaining one of said magnets.

14. A system according to claim 13 wherein each of said pole pieces is curved and projects from said pole annularly and toward said inner drum surface.

15. A system according to claim 14 wherein each said permanent magnet and attached pole pieces have a U-shape with ends facing said inner drum surface.

16. A system according to claim 11 wherein each of said pole pieces is curved and projects from said pole annularly and toward said inner drum surface.

17. A system according to claim 16 wherein each said permanent magnet and attached pole pieces have a U-shape with ends facing said inner drum surface.

* * * * *